United States Patent
Prevoir et al.

(10) Patent No.: US 8,216,740 B2
(45) Date of Patent: Jul. 10, 2012

(54) FUEL CELL

(75) Inventors: Shawn J. Prevoir, Westborough, MA (US); Agota F. Fehervari, Lexington, MA (US)

(73) Assignee: Bose Corporation, Framingham, MA (US)

( * ) Notice: Subject to any disclaimer, the term of this patent is extended or adjusted under 35 U.S.C. 154(b) by 1107 days.

(21) Appl. No.: 11/609,593

(22) Filed: Dec. 12, 2006

(65) Prior Publication Data

US 2008/0138688 A1    Jun. 12, 2008

(51) Int. Cl.
*H01M 8/02* (2006.01)
(52) U.S. Cl. ....................... 429/483; 429/509
(58) Field of Classification Search ............... 429/509, 429/483, 513, 241; 525/241
See application file for complete search history.

(56) References Cited

U.S. PATENT DOCUMENTS

| | | | | |
|---|---|---|---|---|
| 5,173,373 A * | 12/1992 | Ohsuga | ............ | 429/500 |
| 5,468,574 A | 11/1995 | Ehrenberg et al. | | |
| 5,679,482 A | 10/1997 | Ehrenberg | | |
| 6,140,418 A * | 10/2000 | Yamashita et al. | .............. | 525/88 |
| 6,187,464 B1 | 2/2001 | Yasumoto et al. | | |
| 6,197,240 B1 | 3/2001 | Pinchuk | | |
| 6,579,948 B1 | 6/2003 | Tan et al. | | |
| 6,840,969 B2 | 1/2005 | Kobayashi et al. | | |
| 7,531,262 B1 * | 5/2009 | Simpson et al. | ............. | 429/450 |
| 2003/0013000 A1 * | 1/2003 | Kuroki | ............. | 429/35 |
| 2003/0219640 A1 | 11/2003 | Nam et al. | | |
| 2004/0220301 A1 | 11/2004 | Hattori et al. | | |
| 2004/0253502 A1 * | 12/2004 | Shibata et al. | ............. | 429/35 |
| 2005/0014056 A1 | 1/2005 | Zuber et al. | | |
| 2005/0042489 A1 | 2/2005 | Fukuta et al. | | |
| 2005/0112442 A1 * | 5/2005 | Wells et al. | ............. | 429/34 |
| 2005/0187370 A1 | 8/2005 | McCullough et al. | | |
| 2005/0215728 A1 | 9/2005 | Cao et al. | | |
| 2006/0199906 A1 | 9/2006 | Walton et al. | | |
| 2006/0251858 A1 | 11/2006 | Thomas et al. | | |
| 2008/0113244 A1 | 5/2008 | Yamashita et al. | | |

FOREIGN PATENT DOCUMENTS

| | | |
|---|---|---|
| EP | 1852928 | 11/2007 |
| JP | 2007-258003 A | 10/2007 |
| WO | 03030289 | 4/2003 |
| WO | 2007/094185 A1 | 8/2007 |

OTHER PUBLICATIONS

International Search Report and Written Opinion dated Feb. 18, 2009 for PCT/US2008/082795.
Deluca, N.W., et al., "Polymer Electrolyte Membranes for Direct Methanol Fuel Cell: A Review," J. Polymer Science Part B: Polymer Physics, Vil. 44, pp. 2201-2225 (2006).
Elabd, Ya, et al., "Triblock copolymer ionomer membranes Part I. Methanol and proton transport," J. Membrane Science, vol. 217, pp. 227-242 (2003).
Elabd, Ya, et al.,"Triblock copolymer ionomer membranes Part II. Structure characterization and its effects on transport properties and direct methanol fuel cell performance," J. Membrane Science, vol. 231, pp. 181-1880 (2004).

(Continued)

*Primary Examiner* — Jennifer Michener
*Assistant Examiner* — Monique Wills
(74) *Attorney, Agent, or Firm* — Bose Corporation

(57) ABSTRACT

A fuel cell including an MEA sealed by a multi-block copolymer gasket is disclosed. The self-assembling, nanophase-separated polymer exhibits higher corrosion resistance relative to typical silicone gaskets while providing a better seal of the MEA to the fuel cell housing than PTFE.

26 Claims, 3 Drawing Sheets

OTHER PUBLICATIONS

Elabd, Ya, et al.,"Sulfonation and characterization of poly(styrene-isobutylene-styrene) triblock copolymers at high ion-exchange capacities," Polymer, vol. 45, pp. 3037-3043 (2004).

Itsuno, S., et al., "Novel Method for Halomethylation of Cross-Linked Polystyrenes," J. Am. Chem. Soc., vol. 1990, No. 112, pp. 8187-8188 (1990).

Ning, F., "Synthesis of Amphiphilic Block-Graft Copolymers [Poly-(styrene-b-ethylene-co-butylene-b-styrene)-g-Poly (acrylic acid)] and Their Aggregation in Water," J. Polymer Sci. Part A: Polymer Chem., vol. 40, pp. 1253-1266 (2002).

Weiss, R.A., et al., "Block copolymer ionomers: 1. Synthesis and physical properties of sulphonated poly(styrene ethylene/butylenes-styrene)," vol. 32, No. 10, pp. 1867-1874 (1991).

Tan, et al. "Degradation of Gasket Materials in a Simulated Fuel Cell Environment," FUELCELL2006-97124, Proceedings of FUELCELL2006, Jun. 19-21, 2006, Irvine, CA.

International Search Report and Written Opinion dated May 20, 2008 from International Application No. PCT/US2007/087078.

International Preliminary Report on Patentability dated Jun. 24, 2010 for PCT/US2008/082795.

Japanese Office Action dated Mar. 13, 2012 for Application No. 2010-538015.

* cited by examiner

FUEL CELL

BACKGROUND OF THE INVENTION

This description relates to fuel cells.

In a polymer electrolyte fuel cell (PEFC), an electrically non-conducting, proton permeable polymer electrolyte membrane (PEM) separates the anode and cathode of the fuel cell. On the anode side of the fuel cell, fuel is oxidized to produce protons and electrons when the fuel is hydrogen. If the fuel is a hydrocarbon derivative or a functionalized hydrocarbon such as methanol or ethanol, for example, the fuel is oxidized to form protons, electrons, and carbon dioxide. The protons are driven through the PEM to the cathode. On the cathode side of the fuel cell, protons passing through the PEM are combined with oxygen atoms and electrons to form water.

If unreacted fuel reaches the cathode side of the fuel cell, the efficiency of the fuel cell decreases because unreacted fuel does not contribute to the power output of the cell. Furthermore, the fuel can be oxidized at the cathode and may also flood the cathode-side catalyst. Unreacted fuel may reach the cathode by diffusing through the PEM, which usually referred to as crossover. Unreacted fuel may also reach the cathode by leaking around the membrane electrode assembly (MEA), which includes the PEM, an electrocatalyst, and a diffusion layer.

The MEA may be sealed to the fuel cell housing using a gasket to prevent fuel leakage around the MEA. The gasket, however, must be able to withstand the severe electrochemical environment at the anode and cathode and maintain a seal throughout the life of the fuel cell. Silicone is commonly used as a gasket material because of its low cost and ease of fabrication. Silicone, however, degrades under fuel cell operating conditions. PTFE is also commonly used as a gasket material but is expensive relative to the silicones and rubbers typically used in sealing applications. While PTFE can Initially be compressed to form a seal, it tends to relax over time such that leaks form around the seal. Therefore, there remains a need for gaskets that can maintain a seal for the MEA over the life of a fuel cell.

SUMMARY OF THE INVENTION

A fuel cell including an MEA sealed by a multi-block copolymer gasket is disclosed. The self-assembling, nanophase-separated polymer exhibits higher corrosion resistance relative to typical silicone gaskets while providing a better seal of the MEA to the fuel cell housing than PTFE.

One embodiment of the present invention is directed to a fuel cell comprising, a membrane electrode assembly having an anode side and a cathode side; a fuel distributor on the anode side of the membrane electrode assembly, the fuel distributor distributing fuel to an anode of the membrane electrode assembly; a gas distributor or the cathode side of the membrane electrode assembly, the gas distributor providing oxygen to a cathode of the membrane electrode assembly; and a gasket separating the anode side and the cathode side, the gasket comprising a multi-block copolymer. In one aspect, the multi-block copolymer is a nanophase-separated copolymer. In one aspect, the multi-block copolymer is a self-assembling copolymer. In one aspect, the multi-block copolymer comprises an elastomeric block. In one aspect, the multi-block copolymer further comprises a plastic block. In one aspect, the elastomeric block is immiscible in the plastic block. In one aspect, the multi-block copolymer is physically cross-linked by the plastic block. In one aspect, the elastomeric block is selected from a group comprising hydrogenated butadiene, hydrogenated isoprene, hydrogenated chloroprene, isobutylene and ethylene copolymers with $\alpha$-olefins. In one aspect, the elastomeric block is a copolymer. In one aspect, the plastic block is selected from a group comprising styrene, styrene derivatives, methyl methacrylate, methacrylate derivatives, indene, indene derivatives, vinylcarbazole, vinylpyridine, and vinylpyridine derivatives. In one aspect, the plastic block is a copolymer. In one aspect the plastic copolymer is chemically cross-linked. In one aspect, the plastic block is a copolymer of styrene and a styrene derivative. In one aspect, the plastic block is a copolymer of methyl methacrylate and a methacrylate derivative. In one aspect, the multi-block copolymer is a tri-block copolymer. In one aspect, an elastomeric block in the tri-block copolymer is acid resistant. In one aspect, a plastic block in the tri-block copolymer is polystyrene. In one aspect, an elastomeric block in the tri-block copolymer is polyisobutylene. In one aspect, the polyisobutylene is at least 60 vol % and less than 98 vol % of the tri-block copolymer. In one aspect, the polyisobutylene is at least 70 vol % and less than 95 vol % of the tri-block copolymer.

BRIEF DESCRIPTION OF THE DRAWINGS

FIG. 2b is a plant view of the embodiment shown in FIG. 2a; and

DETAILED DESCRIPTION

Figure 1:
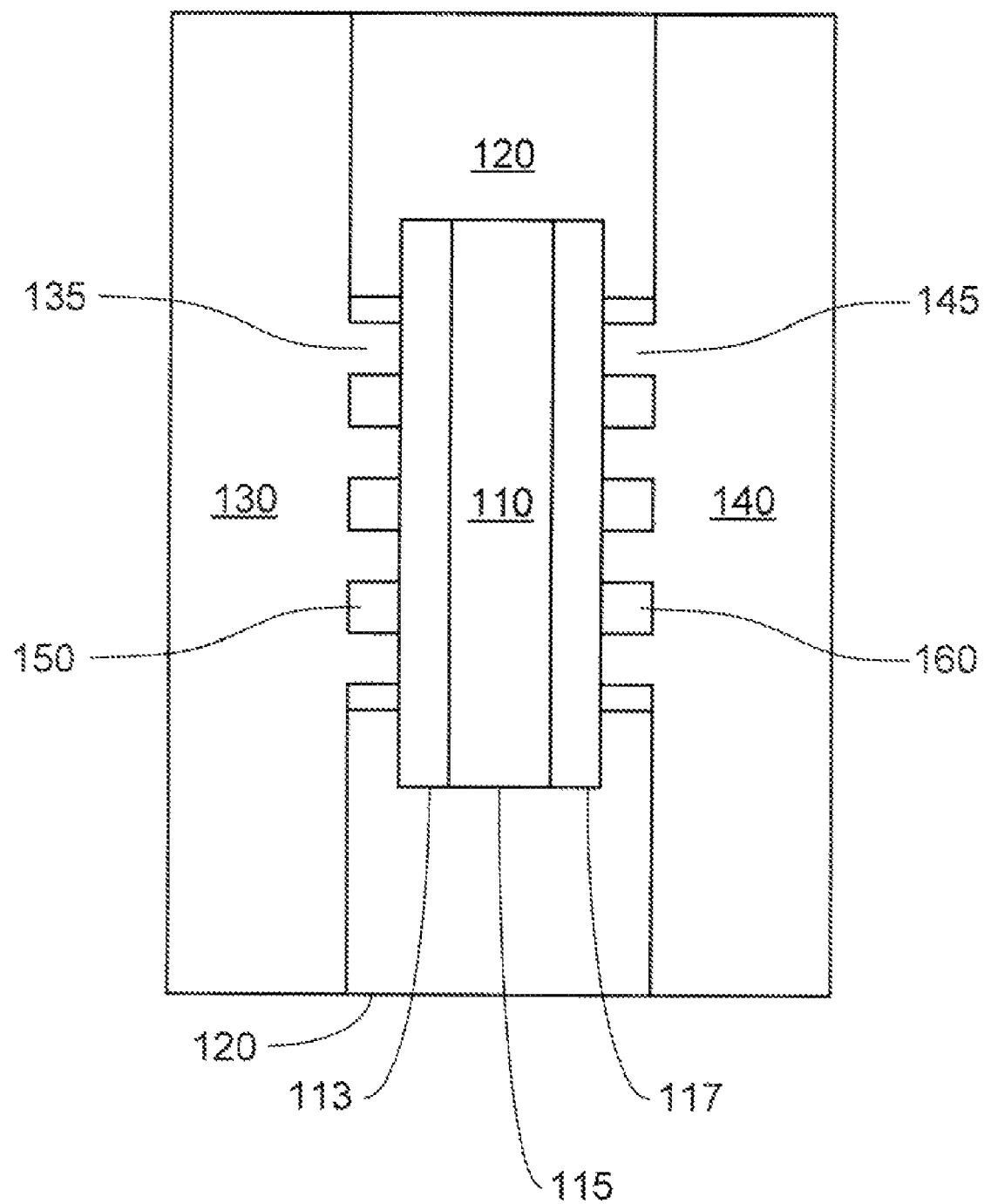
FIG. 1 is a sectional view illustrating an embodiment of the present invention

In FIG. 1, a MEA 110 is supported by a gasket 120. The MEA 110 includes a PEM 115 between an anode 113 and a cathode 117. A fuel distributor 130 delivers fuel such as hydrogen or methanol, for example, to the anode 113 via channels 150. The fuel is oxidized at the anode releasing electrons and protons. The protons diffuse through the PEM 115 to the cathode 117. The electrons are transferred from the anode 113 through ridges 135 in contact with the anode and extracted through the electrically conductive fuel distributor 130. A gas distributor 140 distributes an oxidizer gas to the cathode 117 of the fuel cell. Ridges 145 in the gas distributor 140 are in electrical contact with the cathode and provide a conductive path for electrons to reach the cathode where they react with the oxidizer gas and protons to form water. The ridges 145 define channels 160 delivering the oxidizer gas to the cathode The oxidizer gas may be pure oxygen or a mixture of oxygen and other gases such as, for example, air.

Figure 2A:
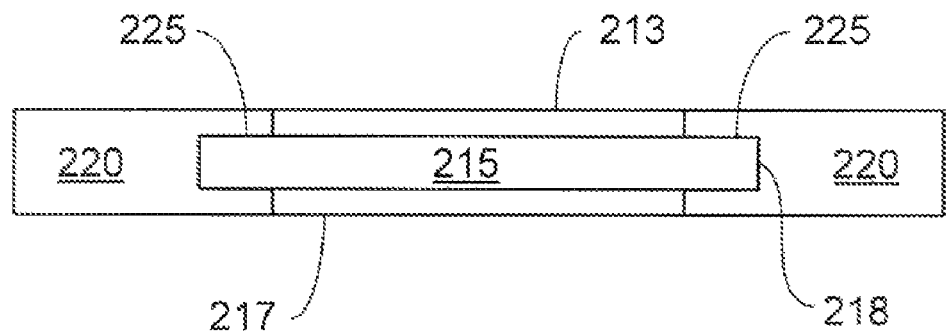
FIG. 2a is a diagram illustrating a sectional view of another embodiment of the present invention.
Figure 2B:
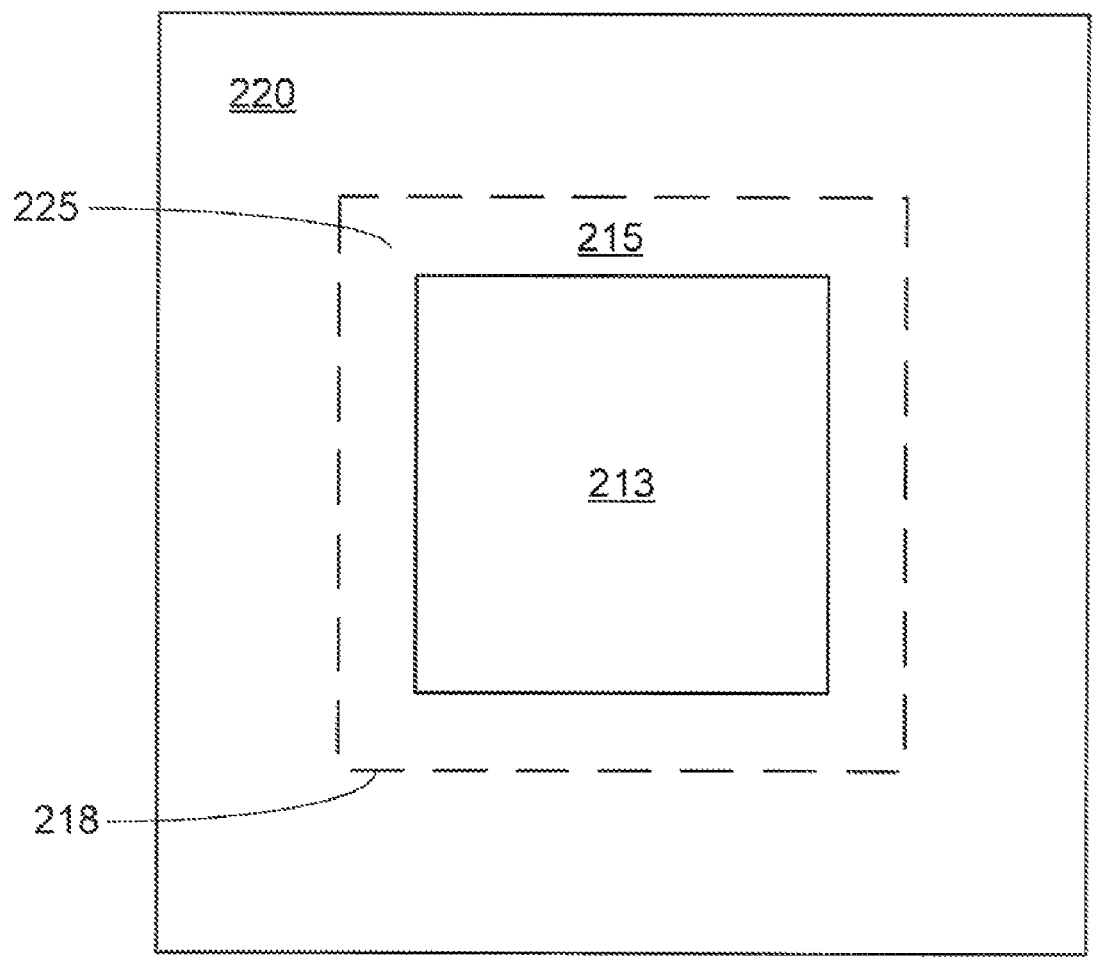

FIG. 2a is a sectional view of a MEA/gasket assembly in another embodiment of the present invention. FIG. 2b is a plan view of the MEA/gasket assembly shown in FIG. 2a, In FIG. 2a, the anode 213 and cathode 217 do not extend to the edge 218 of the PEM 215 thereby leaving an outer portion 225 of the PEM exposed. A gasket 220 overlaps the exposed PEM portion 225 and seals the anode side of the MEA from the cathode side of the MEA.

The gasket preferably comprises a material that resists degradation in an acidic environment and maintains a seal at the use temperature of the fuel cell for a significant portion of the expected fuel cell life. Elastomers such as silicons, natural rubbers, and synthetic rubbers may be capable of forming a seal but degrade in the acidic environment of the fuel cell or may leach vulcanizing additives into the fuel cell that interfere with fuel cell function.

In some embodiments, the gasket comprises a multi-block copolymer exhibiting physical, as opposed to chemical, crosslinking. A multi-block copolymer comprises two or more blocks within a single polymer, molecule. Each block comprises a polymerized monomer or a copolymer. The type of polymer comprising a each block, as well as the length of each block, may be selected to optimize a desired characteristic of the multi-block copolymer such as, for example, strength, acid resistance, or creep resistance.

An example of a multi-block copolymer is an ABA block copolymer such as SIBS, which is a styrene-isobutylene-styrene block copolymer. The A block in SIBS is the styrene block and the B block is the isobutylene block. In SIBS, the B block is terminated at both ends by an A block.

Multi-block copolymers are not limited to only two block types as in SIBS tri-block copolymer. For example, an ABC block copolymer has two different end blocks, A and C. An ABCA block copolymer has the same end block but includes two different interior blocks, B and C A di-block copolymer, AB, is the simplest example of a multi-block polymer. Other examples of multi-block copolymers include copolymers having linear, branched or star branched backbones as well as graft copolymers. Although the following description uses the SIBS as an exemplar block copolymer, the skiled artisan may apply these teachings to other multi-block copolymers, which is understood to be within the scope of the present invention.

In some embodiments, an elastomeric polymer is selected as the B block in a tri-block copolymer. An elastomeric polymer is characterized by a glass transition temperature, Tg, that is less than its use temperature. For a direct methanol fuel cell (DMFC), the use temperature is typically between 0-80° C. In this example, the B block is referred to as the elastomeric block. The A block in the block copolymer preferably has a Tg greater than the use temperature to provide strength via physical cross-linking of the A block. In this example, the A block is referred to as the plastic block.

The elastomeric polymer preferably has a carbon backbone that has little or no carbon double bonds in the backbone and more preferably a fully saturated backbone. Without being limiting, it is believed that the absence of carbon double bonds Increases the acid resistance of the polymer chain. Examples of such acid resistant elastomeric polymers Include hydrogenated butadiene, hydrogenated isoprene, hydrogenated chloroprene, and isobutylene. The elastomeric polymer may be a copolymer such as, for example, ethylene copolymers with α-olefins.

The plastic block may be polymers of styrene or styrene derivatives such as, for example, α-methylstyrene, methylstyrene, chlorostyrene, hydroxystyrene, and vinylbenzyl chloride. Other examples of plastic polymers include polymers of indene, indene derivatives such as, for example, methylindene, ethylindene, and trimethylindene, vinylpyridine, vinylpyridine derivatives such as for example, vinylmethylpyridine, vinylbutylpyridine, vinylquinioline, and vinylacrydine, methyl methacrylate, methacrylate derivatives such as, for example, hydroxyethyl methacrylate or dimethylamino-ethyl methacrylate, and vinylcarbazole. The plastic block may be a copolymer such as, for example, copolymers of styrene and styrene derivatives, copolymers of methyl methacrylate and methacrylate derivatives, copolymers of indene and indene derivatives, copolymers of vinylpyridine and vinylpyridine derivatives copolymers of α-methylstyrene, methylstyrene and indene, copolymers of vinylpyridine and methyl methacrylate, and copolymers of styrene and vinylbenzyl chloride.

The elastomeric block is preferably immiscible with the plastic block. Without being limiting, it is believed that the immiscibility of the elastomeric and plastic blocks causes the multi-block copolymer to phase separate into plastic-rich regions and elastomenic-rich regions. The self-assembly of the multi-block copolymers into plastic regions and elastomeric regions is believed to occur on the scale of nanometers. Physical entanglement of the plastic blocks from different polymers within a plastic-rich region creates a physical cross-linking of the multi-block copolymer that may increase the strength of the multi-block copolymer. Unlike vulcanization where a chemical bond is formed between polymers, physical entanglement of the plastic blocks does not require vulcanization aids that can leach out of the elastomer and affect the operation of the fuel cell. Furthermore, physical cross-linking is thermally reversible in contrast to vulcanization, which is thermally irreversible.

When the expected use temperature is near the Tg of the plastic block, chemical cross-inking within the plastic polymer block can increase the strength and creep resistance of the multi-block copolymer without appreciably affecting its elastomeric properties. Limiting chemical cross-linking to the plastic-rich regions can increase the strength and creep resistance of the gasket without significantly affecting the elastomeric properties of the gasket, which is dominated by the elastomeric block. For example, a plastic block comprising a copolymer of styrene and chloromethyl styrene can increase the strength and creep resistance of the multi-block copolymer by chemically cross-linking the styrene/chloromethyl styrene copolymer. A di-amine or multifunctional amine may be used to form a chemical bridge between a chloromethyl styrene mer on one copolymer with a chloromethyl styrene mer on another copolymer. In another example, a copolymer of styrene and vinylpyridine may be chemically cross-linked using a di- or tri-halide or a di- or tri-epoxide to bridge across vinylpyridine on different copolymer molecules. In another example, a copolymer of methyl methacrylate and a methacrylate derivative may be used as the plastic block copolymer wherein the copolymer is chemically cross-linked across methacrylate derivatives on different copolymer molecules. In another example, a plastic block of styrene may be converted to a copolymer via chloromethylation. The converted copolymer may then be chemically cross-linked using an appropriate cross-linking agent. In this example, the extent of cross-linking may be controlled by adjusting the reagents used in the chloromethylation or by adjusting the amount of cross-linking agent.

The strength of the gasket may be adjusted by adjusting the ratio of copolymers in the plastic block. For example, in a plastic copolymer block of styrene and a styrene derivative, as the fraction of styrene derivative is increased, the strength is expected to increase. Alternatively, the fraction of styrene derivative in the plastic copolymer block may be held constant and the strength of the gasket adjusted by controlling, within stoichiometric limits, the amount of the cross-linking agent introduced to the plastic copolymer block during the cross-linking process.

The elastomeric block is preferably the majority portion of the multi-block copolymer and represents at least 60 vol % and less than 98 vol %, and more preferably at least 70 vol % and less than 95 vol %, of the multi-block copolymer. The large fraction of the elastomeric block in the multi-block copolymer is believed to ensure that the morphology of the multi-block copolymer has a continuous elastomeric phase.

Being the continuous majority fraction of the multi-block copolymer, the high corrosion resistance and sealing ability of the elastomeric block is substantially retained in the multi-block copolymer.

Multi-block copolymers may be manufactured using a living polymerization process and are available from various manufacturers. For example, a SIBS tri-block copolymer is also available under the SIBSTAR trade name from Kaneka North America of New York, N.Y. Processing of the multi-block copolymer into a fuel cell gasket may use any of the methods known to one of skill in the art and include heating the multi-block copolymer above the Tg of the plastic block, injection molding or cast molding into a desired shape, and cooling the gasket below the Tg of the plastic bock. Alternatively, the multi-block copolymer may be formed into sheets, cut to the desired shape, layered with a MEA between two such sheets, pressed at a temperature greater than the Tg of the plastic block, and cooled to a temperature below the Tg of the plastic block to produce a one-piece MEA/gasket assembly.

In some embodiments, a MEA/gasket assembly may have an outer layer that acts as a release layer for the MEA/gasket assembly. During construction or operation of the fuel cell, the multi-block copolymer may tend to adhere to the gas distributor, fuel distributor, or another part of the fuel cell housing in contact with the gasket. This increases the difficulty of recovering the MEA at the end of life. The release layer does not adhere to the fuel cell housing thereby facilitating the removal of the MEA from the fuel cell housing without damaging the housing.

Figure 3:
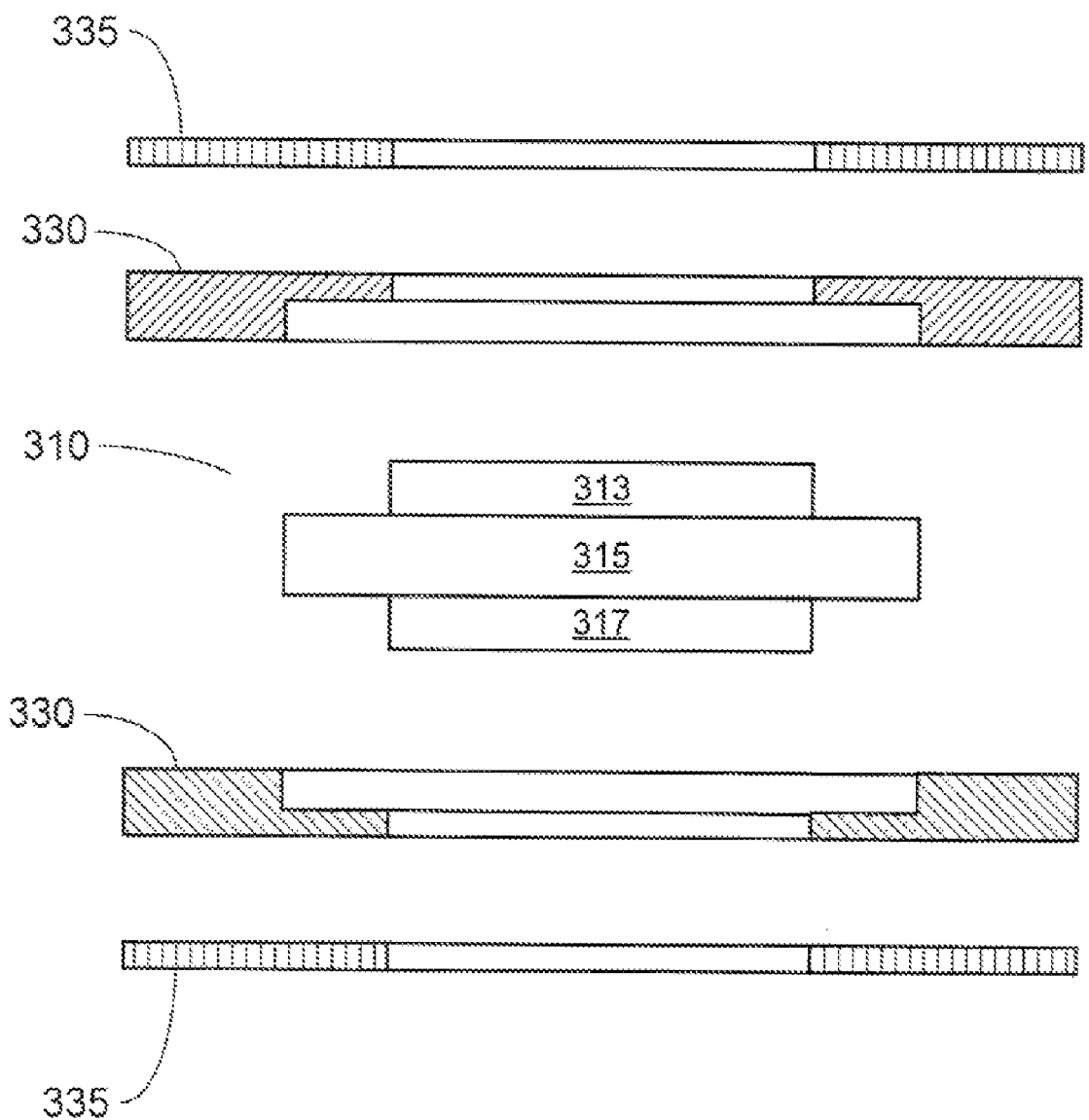
FIG. 3 is an exploded cross-sectional diagram illustrating another embodiment of the present invention.

FIG. 3 illustrates an exploded sectional view of an embodiment having a release layer in FIG. 3, an MEA 310 includes an anode 313, a PEM 315, and a cathode 317. The edge of the PEM is sandwiched between two inner gasket layers 330 and two outer release layers 335. The inner gasket layer 330 is a multi-block copolymer such as, for example, a tri-block copolymer. The outer release layer 339 may be selected based on its low adhesion to the fuel cell housing. For example, polytetrafluoroethylene, PTFE, does not adhere to fuel cell housing materials and may be used as the outer release layer 335. The layered structure shown in FIG. 3 may be pressed and heated to a temperature above the Tg of the plastic block of the multi-block copolymer to allow the inner gasket layer to fuse into a single layer.

Having thus described at least illustrative embodiments of the invention, various modifications and improvements will readily occur to those skilled in the art and are intended to be within the scope of the invention. For example, the gasket may be a set of o-rings including a first o-ring sealing the anode side of the MEA and a second o-ring sealing the cathode side of the MEA. Accordingly, the foregoing description is by way of example only and is not intended as limiting. The invention is limited only as defined in the following claims and the equivalents thereto.

What is claimed:

1. A fuel cell comprising:
a membrane electrode assembly having an anode side and a cathode side;
a fuel distributor on the anode side of the membrane electrode assembly, the fuel distributor distributing fuel to an anode of the membrane electrode assembly;
a gas distributor on the cathode side of the membrane electrode assembly, the gas distributor providing oxygen to a cathode of the membrane electrode assembly; and
a gasket separating the anode side and the cathode side, the gasket comprising a multi-block copolymer, wherein the multi-block copolymer comprises an elastomeric block selected from the group consisting of: isobutylene, and an ethylene copolymer with an α-olefin.

2. The fuel cell of claim 1 wherein the multi-block copolymer comprises a nanophase-separated copolymer.

3. The fuel cell of claim 2 wherein the multi-block copolymer comprises a self-assembling copolymer.

4. The fuel cell of claim 1 wherein the multi-block copolymer further comprises a plastic block.

5. The fuel cell of claim 4 wherein the elastomeric block is immiscible in the plastic block.

6. The fuel cell of claim 4 wherein the multi-block copolymer is physically cross-linked by the plastic block.

7. The fuel cell of claim 1 wherein the elastomeric block is a copolymer.

8. The fuel cell of claim 4 wherein the plastic block is selected from the group consisting of: styrene, a styrene derivative, methyl methacrylate, a methacrylate derivative, indene, an indene derivative, vinylpyridine, a vinylpyridine derivative, and vinylcarbazole.

9. A fuel cell comprising:
a membrane electrode assembly having an anode side and a cathode side;
a fuel distributor on the anode side of the membrane electrode assembly, the fuel distributor distributing fuel to an anode of the membrane electrode assembly;
a gas distributor on the cathode side of the membrane electrode assembly, the gas distributor providing oxygen to a cathode of the membrane electrode assembly; and
a gasket separating the anode side and the cathode side, the gasket comprising a multi-block copolymer, wherein the multi-block copolymer further comprises a plastic block, wherein the plastic block is a copolymer.

10. The fuel cell of claim 9 wherein the plastic copolymer is chemically cross-linked.

11. The fuel cell of claim 9 wherein the plastic block comprises a copolymer of styrene and a styrene derivative.

12. The fuel cell of claim 9 wherein the plastic block comprises a copolymer of methyl methacrylate and a methacrylate derivative.

13. The fuel cell of claim 1 wherein the multi-block copolymer is a tri-block copolymer.

14. The fuel cell of claim 13 wherein an elastomeric block in the tri-block copolymer is acid resistant.

15. The fuel cell of claim 13 wherein a plastic block in the tri-block copolymer comprises polystyrene.

16. A fuel cell comprising:
a membrane electrode assembly having an anode side and a cathode side;
a fuel distributor on the anode side of the membrane electrode assembly, the fuel distributor distributing fuel to an anode of the membrane electrode assembly;
a gas distributor on the cathode side of the membrane electrode assembly, the gas distributor providing oxygen to a cathode of the membrane electrode assembly; and
a gasket separating the anode side and the cathode side, the gasket comprising a multi-block copolymer, wherein the multi-block copolymer is a tri-block copolymer, and an elastomeric block in the tri-block copolymer comprises polyisobutylene.

17. The fuel cell of claim 16 wherein the polyisobutylene is at least 60 vol % and less than 98 vol % of the tri-block copolymer.

18. The fuel cell of claim 16 wherein the polyisobutylene is at least 70 vol % and less than 95 vol % of the tri-block copolymer.

19. A gasket for use in a fuel cell that includes a membrane electrode assembly having an anode side and a cathode side; the gasket configured to separate the anode side and the cathode side of the membrane electrode assembly, the gasket comprising a multi-block copolymer, wherein the multi-block copolymer comprises a plastic block selected from the group consisting of: a styrene derivative, methyl methacrylate, a methacrylate derivative, indene, an indene derivative, vinylpyridine, a vinylpyridine derivative, and vinylcarbazole.

20. The gasket of claim 19 wherein the multi-block copolymer comprises an elastomeric block.

21. The gasket of claim 20 wherein the elastomeric block is a copolymer.

22. The gasket of claim 20 wherein the elastomeric block is acid resistant.

23. The gasket of claim 22 wherein the elastomeric block is immiscible in the plastic block.

24. The gasket of claim 22 wherein the plastic block is a copolymer.

25. The gasket of claim 23 wherein the plastic copolymer is chemically cross-linked.

26. A gasket for use in a fuel cell that includes a membrane electrode assembly having an anode side and a cathode side, the gasket configured to separate the anode side and the cathode side of the membrane electrode assembly, the gasket comprising a multi-block copolymer; and wherein the multi-block copolymer comprises an elastometric block, wherein the elastomeric block is acid resistant, wherein the elastomeric block is immiscible in the plastic block, and the plastic block comprises a copolymer of styrene and a styrene derivative.

* * * * *